June 23, 1925.                                                1,543,075
G. FORNACA
SYSTEM OF OPERATING TURNTABLES BY MEANS OF TRACTORS
Filed July 18, 1924
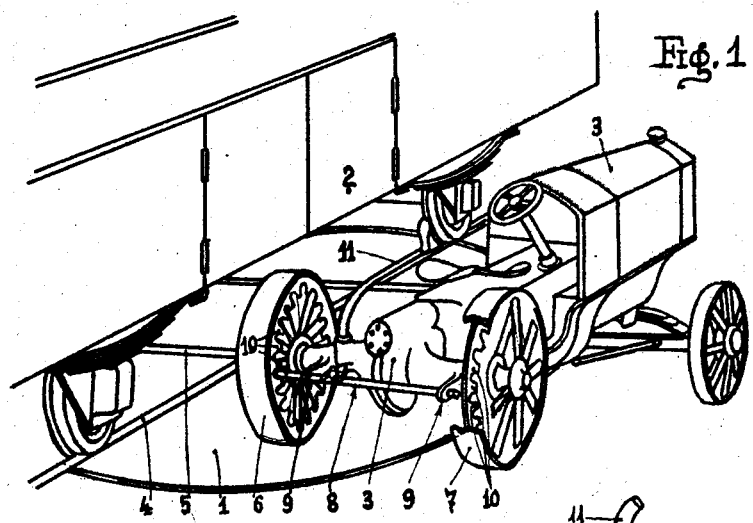
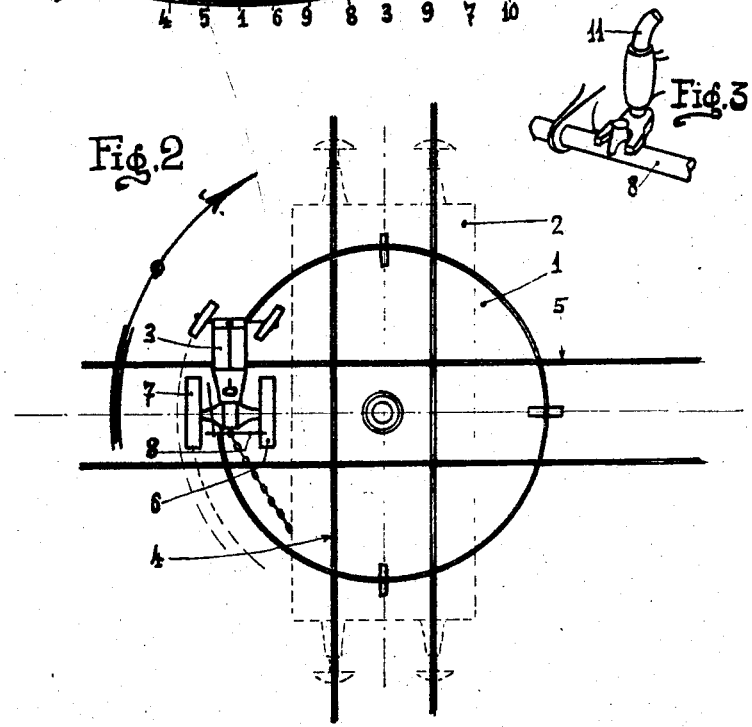

Patented June 23, 1925.

1,543,075

UNITED STATES PATENT OFFICE.

GUIDO FORNACA, OF TURIN, ITALY.

SYSTEM OF OPERATING TURNTABLES BY MEANS OF TRACTORS.

Application filed July 18, 1924. Serial No. 726,850.

*To all whom it may concern:*

Be it known that I, GUIDO FORNACA, a subject of the King of Italy, resident of 7, Via Giannone, Turin, in the Kingdom of Italy, and whose post-office address is 7, Via Giannone, Turin, Italy, have invented certain new and useful Improvements in Systems of Operating Turntables by Means of Tractors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention provides a system of operating turntables by a tractor, and is characterized by the fact that the tractor is brought to a position where the wheels at one side only are on the turntable after which the driving wheel at that side is locked against rotation, whereupon movement of the tractor while it is connected with the turntable or with the vehicle thereon imparts a rotary movement to the table.

The invention enables railway wagons to be shunted with great rapidity and economy without sudden jolts or shocks and resulting wear.

After the tractor has hauled a wagon on to the turntable it is stopped at the side of the latter with the wheels at the side nearest to the wagon on the table and the wheels on the other side off the table, and the driving wheel on the table is thereafter locked against rotation, so that when the tractor is again started only the outside driving wheel rotates while the tractor remains always in position at the side of the wagon ready to move the latter from the table in the required direction.

During the rotary movement of the turntable, the tractor follows a curved path as guided by the driver and the latter can easily keep in view the stop pawl of the turntable and can, therefore, apply the tractor brakes at an opportune moment to bring the turntable to rest without sudden jar or shock, which is not possible when the movement is effected by animal traction owing to the fact that the person attending to the horse or other animal cannot readily see the stop pawl and in no case can apply a braking action to the turntable.

A feature of the invention consists in the means embodied in the tractor whereby one or other of the driving wheels can be locked against rotation. In accordance with the invention this means comprises a movable cross bar adapted to engage one or other of the driving wheels according to its position as controlled by the driver of the tractor. Preferably, the periphery of each driving wheel is formed or provided with teeth and the cross bar is mounted for axial movement through the medium of a lever within reach of the driver and by which it can be moved to engage between the teeth of one or other of said wheels.

The appended drawing shows diagrammatically an example of the system and of the aforesaid locking means on a Fiat tractor.

Fig. 1 is a perspective view of the tractor arranged at the side of the wagon and partly on the turntable ready to turn the latter.

Fig. 2 is a plan view.

Fig. 3 is a detail of the control for the wheel locking means.

Referring to the drawing, 1 denotes the turntable, 2 the wagon, and 3 the tractor.

Assume that the tractor 3 has been connected with the wagon 2, as by means of a chain or the like, Fig. 2, and has drawn it on to the turntable 1 along the track 4 and that after rotary movement of the turntable in the direction of the arrow (Fig. 2) the wagon is to be drawn along the track 5. It is evident that when once the tractor has been stopped in the position shown in Fig. 2 and immediately the wagon moving along the track 4 arrives on the turntable 1, it is possible, after having locked the driving wheel 6 while leaving the driving wheel 7 free, to produce the required rotary movement of the turntable by again setting the tractor in motion and suitably guiding same in a circular path. Sudden shocks in stopping the turntable at the completion of the required rotary movement can be avoided by applying the tractor brakes and the wagon can immediately be drawn along the track 5 simply by releasing the driving wheel 6, the tractor being already at the side of the wagon in its new position. Reversal of the tractor produces movement of the turntable in the opposite direction.

The means for locking one or other of the tractor driving wheels against rotation comprises a cross bar 8 mounted axially in supports 9 and adapted to engage between teeth 10 on the periphery of each driving wheel (Fig. 1).

Axial displacement of the crossbar 8 may suitably be effected by means of a lever 11 under the control of the driver of the tractor.

It is apparent that by moving the crossbar from its neutral position axially in one direction it will engage the teeth 10 on the tractor driving wheel 6 while leaving the driving wheel 7 free and that by moving it in the opposite direction from the neutral position it will engage the teeth 10 of the driving wheel 7 while leaving the driving wheel 6 free.

What I claim is:

1. A system of operating turntables for shunting railway wagons, by means of a tractor, in which the tractor (after it has hauled a wagon on to the turntable) is stopped) with the wheels at one side on the table and the wheels at the other side off the table, the driving wheel on the table being thereafter locked, so that when the tractor is again started only the outside driving wheel rotates compelling the table to turn while the tractor remains always in position at the side of the wagon ready to move the latter from the table in the required direction.

2. A tractor for use in the system claimed in claim 1, having means whereby one or other of its driving wheels can be locked against rotation, said means comprising a crossbar movable by the driver of the tractor to engage one or other of said driving wheels.

In testimony that I claim the foregoing as my invention, I have signed my name.

GUIDO FORNACA.